(12) United States Patent
Heuser et al.

(10) Patent No.: US 12,710,733 B2
(45) Date of Patent: Aug. 18, 2026

(54) SYSTEM FOR CONTROLLING AND/OR REGULATING A PLURALITY OF MACHINES

(71) Applicant: Siemens Aktiengesellschaft, Munich (DE)

(72) Inventors: Karsten Heuser, Erlangen (DE); Jens Jähnicke, Chemnitz (DE)

(73) Assignee: Siemens Aktiengesellschaft, Munich (DE)

(*) Notice: Subject to any disclaimer, the term of this patent is extended or adjusted under 35 U.S.C. 154(b) by 480 days.

(21) Appl. No.: 18/033,752

(22) PCT Filed: Aug. 18, 2021

(86) PCT No.: PCT/EP2021/072919
§ 371 (c)(1),
(2) Date: Apr. 25, 2023

(87) PCT Pub. No.: WO2022/089807
PCT Pub. Date: May 5, 2022

(65) Prior Publication Data

US 2023/0400828 A1 Dec. 14, 2023

(30) Foreign Application Priority Data

Oct. 26, 2020 (EP) .................................... 20203875

(51) Int. Cl.
*G05B 19/042* (2006.01)
*G06Q 30/018* (2023.01)

(52) U.S. Cl.
CPC ......... *G05B 19/042* (2013.01); *G06Q 30/018* (2013.01); *G05B 2219/2203* (2013.01)

(58) Field of Classification Search
CPC .......... G05B 19/042; G05B 2219/2203; G06Q 30/018; B22F 12/82; B22F 10/85; H02P 5/00; B33Y 50/02; Y02P 10/25
See application file for complete search history.

(56) References Cited

U.S. PATENT DOCUMENTS 8,854,669 B1 * 10/2014 Jazayeri ................ G06F 3/1288 358/1.15
2008/0127137 A1 * 5/2008 Becker ...................... G06F 8/44 717/100

(Continued)

FOREIGN PATENT DOCUMENTS

CN 104583042 A 4/2015
CN 110308709 A 10/2019

(Continued)

OTHER PUBLICATIONS

PCT International Search Report and Written Opinion of International Searching Authority mailed Nov. 29, 2021 corresponding to PCT International Application No. PCT/EP2021/072919 filed Aug. 18, 2021.

*Primary Examiner* — Chad G Erdman
(74) *Attorney, Agent, or Firm* — Henry M. Felereisen LLC

(57) ABSTRACT

A system for controlling and/or regulating a plurality of machines includes a control unit designed to communicate with the plurality of machines and to transmit to at least one of the plurality of machines a data packet which includes an instruction for carrying out a work task, and a licensing unit designed to provide a license required for carrying out the work task, with the license being awarded in the presence of an authorization to carry out the work task when the at least one of the plurality of machines meets a certain technical requirement.

12 Claims, 1 Drawing Sheet

(56) References Cited

U.S. PATENT DOCUMENTS

2012/0127490 A1* 5/2012 Ogasawara ............. G06F 21/10
726/29
2015/0217763 A1 8/2015 Reichel et al.
2018/0278187 A1 9/2018 Tian
2018/0345499 A1 12/2018 Mueller et al.
2019/0184726 A1* 6/2019 Lamproye ............ B41M 5/0023
2020/0223312 A1* 7/2020 Heitsman ............. G06V 40/172
2022/0032631 A1* 2/2022 Ward ................... B41J 2/17506

FOREIGN PATENT DOCUMENTS

DE 10 2017 005 137 A1 12/2018
EP 2341405 A2 7/2011
WO WO 2020/147016 A1 7/2020

* cited by examiner

FIG 1
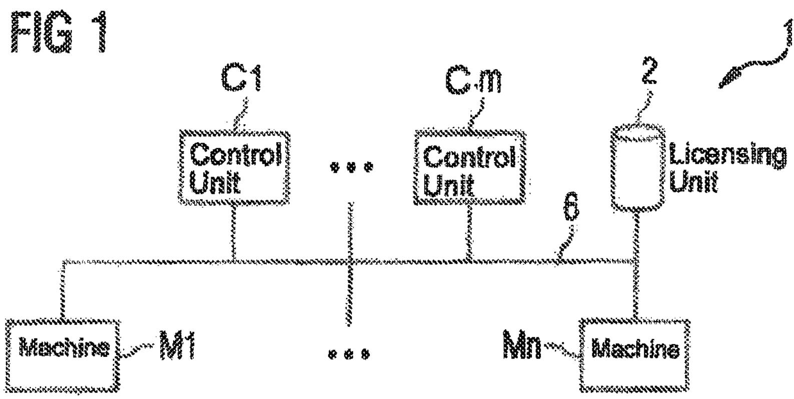
FIG 2
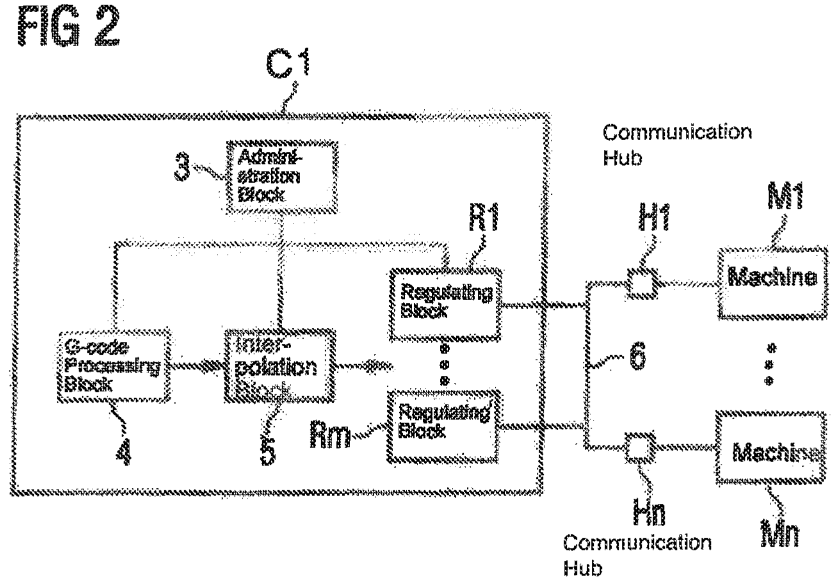
FIG 3
Transmitting a data packet to a machine — S1
Instructing machine by data packet to perform a work task — S2
Providing a license required to perform the work task — S3

SYSTEM FOR CONTROLLING AND/OR REGULATING A PLURALITY OF MACHINES

CROSS-REFERENCES TO RELATED APPLICATIONS

This application is the U.S. National Stage of International Application No. PCT/EP2021/072919, filed Aug. 18, 2021, which designated the United States and has been published as International Publication No. WO 2022/089807 A1 and which claims the priority of European Patent Application, Serial No. 20203875.8, filed Oct. 26, 2020, pursuant to 35 U.S.C. 119(a)-(d).

BACKGROUND OF THE INVENTION

The Invention relates to a system for controlling and/or regulating a plurality of machines.

DE 10 2017 005 137 A1 discloses a robotic system, the system comprising drivers which integrate the circuit breakers and communication electronics for communication via power lines or for wireless communication or for communication via another commonly used communication channel. In a robotic system comprising such drivers, one or more central controllers communicate with at least one actuator driver via a communication channel, wherein the communication channel is exposed to a fault caused by an actuator and wherein the communication and/or the operation of the actuators is or are modified in anticipation of the fault occurring so that reliable communication can be ensured.

US 2018/278187 A1 discloses a system comprising: an electric motor; and a controller which is configured to generate a control signal which controls a speed of the electric motor during a reference start operation and sensorless closed loop control operation, wherein the controller is configured to generate the control signal for the reference start operation based on a value of a stator flux current reference which is determined based on a rotor flux projection on a reference d-axis of a rotating frame coordinate system, wherein the controller is configured to increase the stator flux current reference during the reference start operation and to set the stator flux current reference for the reference start operation at a time at which it is determined that the rotor flux projection is equal to a value ISD1 or greater than a defined threshold value.

Typical machine parks comprise a plurality of machines, a control unit being assigned to each machine.

Due to the high number of required control units as a result, this is very cost-intensive and less efficient.

The object of the invention is to improve a machine park in this respect.

SUMMARY OF THE INVENTION

The object is achieved by a system for controlling and/or regulating a plurality of machines, with at least one common licensing unit and with at least one control unit, the control unit being designed to communicate with a plurality of machines, the control unit transmitting a data packet to one machine or multiple machines, wherein the data packet comprises an instruction for carrying out a work task, the licensing unit providing a license required for carrying out the work task.

A license is then advantageously awarded when a certain condition is met. This condition can be a payment made or another property of the machine.

The license is advantageously awarded if there is an authorization to carry out the work task.

An authorization may exist if the machine meets certain technical requirements (for example, a certain type of 3D printing is possible with the machine or a certain speed can be maintained) or a payment has been made.

The use of one or more powerful control units which is or are designed to control and/or regulate a multiplicity of machines or systems is advantageous here.

An arrangement as an array with an m:n relationship is advantageous here. This is shown in more detail in the figures.

Dispensing with a 1:1 assignment of the control unit and the machine improves dynamics as well as system utilization.

In an advantageous embodiment, the control unit carries out at least one computing step to determine the instruction for the machine and/or for the machines. A computing step is, for example, a G-code preprocessing, an interpolation, regulating and/or controlling of axes of the machine or a different administrative task.

In an advantageous embodiment, the system is designed in such a manner that an identifier can be assigned to the computing step. This is advantageous because as a result, a computing step can be assigned to an individual machine during serial processing in the control process. In this manner, it is possible to determine for which machine the computing step is intended. The identifier preferably includes a coding which has a relationship between the computing step and the machine.

In an advantageous embodiment, the control unit or the plurality of control units, the machine or the machines and the licensing unit are communicatively connected, in particular via a bus system.

Bus systems such as, for example, ProfiNet with Industrial Real Time Ethernet (IRT) are particularly suitable for this purpose. Others are also possible.

Furthermore, communication by means of Ethernet is possible.

It is also possible that the control unit or the plurality of control units, the machine or the machines and the licensing unit communicate with one another wirelessly or without cables.

This Is achieved, for example, by means of Bluetooth, WLAN, ZigBee, NFC, Wibree or WIMAX.

In addition, communication via radio, in particular mobile radio, is possible. The mobile radio standards 4G and/or 5G are particularly suitable here.

Mixed forms are also conceivable.

In an advantageous embodiment, a control unit for carrying out a defined computing step is configured from a number of computing steps or a plurality of defined computing steps from the number of computing steps.

For this purpose, the control unit can be designed to be specialized for a certain task by means of optimized hardware and/or software.

In an advantageous embodiment, the plurality of control units is designed in such a manner that, after determining the current utilization of the control units, the computing step or the computing steps are carried out dynamically by the control unit or the control units adapted to the current utilization.

In other words, this means that computing steps are carried out collaboratively, depending on the current utilization of the control unit. In this case, a plurality of structurally identical control units can be arranged.

In an advantageous embodiment, the machine comprises a data provision unit, the data provision unit being designed to provide machine-specific data to the control unit.

For a correct processing of computing steps, each control unit advantageously has access to the machine-specific data.

In an advantageous embodiment, the machine comprises a communication hub or is connected to a communication hub, the communication hub being designed for the bundled transmission of machine-specific data.

This is advantageous as a communication load is reduced thereby and thus an overload of the bus system is prevented. Furthermore, a real-time capability of the system is also ensured thereby as the transmission of data packets is not delayed.

In an advantageous embodiment, the licensing unit is designed to provide floating licenses.

A floating license is advantageously available for a plurality of machines. Advantageously, a plurality of floating licenses is combined in a license pool. A flat fee is usually charged for this.

The machine or the control unit responsible for the machine uses the license which it currently requires. The machine or the control unit responsible for the machine can advantageously use any license from the license pool, but in most cases does not require every license.

In an advantageous embodiment, the licensing unit is designed to provide pay-per-use licenses.

Pay-per-use licenses enable billing according to use of the service. This means that payment is only made for a license which is actually used.

The machine or the control unit responsible for the machine uses the license which it currently requires. Payment is also only made for this license.

In an advantageous embodiment, at least one machine, preferably a plurality of machines, is designed to produce a three-dimensional object by means of additive manufacturing. A machine is preferably a 3D printer.

The machine is advantageously designed to execute one or more 3D printing methods. These include, for example, free jet binder application, material application with directed energy input, material extrusion, free jet material application, powder bed-based smelting, layer lamination and bath-based photopolymerization. Other methods are also possible.

The above object is furthermore achieved by a method for operating such a system, wherein at least one control unit transmits a data packet to one machine or multiple machines, wherein the data packet instructs the machine or machines to carry out a work task, wherein a license required for carrying out the work task is provided by the licensing unit.

In an advantageous embodiment, at least one computing step is carried out by the control unit to determine the instruction for the machine and/or for the machines.

In an advantageous embodiment, at least one setpoint value for at least one actuator is transmitted to the machine or machines.

In this case, an actuator is a component which converts electrical signals into mechanical movement or into other physical variables. Actuators are, for example, axes of the machine, heating elements, extruders, feed axes. Other actuators are also possible.

The invention offers the advantage that simple machines can be cost-effectively combined to form a machine park. The infrastructure also enables a system capable of real-time. The invention is also advantageous as time and costs for updates, in particular firmware updates, can be saved.

Furthermore, license costs can be optimized.

BRIEF DESCRIPTION OF THE DRAWING

The invention is described and explained in more detail hereinafter with reference to the exemplary embodiments shown in the figures. It is shown in:

FIG. 1 the system for controlling and/or regulating a plurality of machines, FIG. 2 a structure within the control unit, by way of example, FIG. 3 a method for operating such a system.

FIG. 1 shows the system for controlling and/or regulating a plurality of machines M1, . . . , Mn.

DETAILED DESCRIPTION OF PREFERRED EMBODIMENTS

The system 1 has a common licensing unit 2 and at least one control unit C1. Advantageously, a plurality of control units C1, . . . , Cm is present. The control unit C1 is designed in such a manner that a data packet can be transmitted to one machine M1 or multiple machines M1, . . . , Mn.

The data packet comprises an instruction for carrying out a work task. The licensing unit 2 provides a license required for carrying out the work task. The control unit C1 or the plurality of control units C1, . . . , Cm, the machine M1 or the plurality of machines M1, . . . , Mn and the licensing unit 2 are preferably communicatively connected, in particular via a bus system 6.

The invention enables one or more powerful control units to control a multiplicity of machines. This is advantageously achieved by means of an m:n relationship.

Communication can take place both via a common bus (shown as a bus system 6) and via a direct bus (not shown) between one control unit C1 or multiple control units C1, . . . , Cm and one machine M1 or multiple machines M1, . . . , Mn.

FIG. 2 shows a structure within the control unit C1 by way of example.

FIG. 2 shows that the control unit C1 has an administration block 3, a G-code processing block 4 and an interpolation block 5 for carrying out computing steps. Furthermore, the control unit C1 contains at least one, preferably a plurality of regulating blocks R1, . . . , Rm. There is a communicative connection between the blocks 3, 4, 5, R1, . . . , Rm.

The figure furthermore shows that the plurality of machines M1, . . . , Mn, each has a communication hub H 1, . . . , Hn or is connected to a communication hub H1, . . . , Hn. The communication hub H1, . . . , Hn is designed for bundled transmission of machine-specific data.

Machine-specific data is, for example, data which describes a machine property, such as, for example, a reference point, axis gain factors, dynamics settings or a maximum speed of the axis. Furthermore, machine-specific data also comprises actual values of the machine, such as, for example, temperature, axis position or other sensor values.

In a control unit C1, . . . , Cm, data from multiple machines M1 . . . Mn is advantageously present.

Machine-specific data generated during commissioning can be stored, for example, in a commissioning archive.

The control units C1, . . . , Cm can be specialized to suit particular tasks by means of optimized hardware and software. Thus, for example, a first control unit could carry out G-code preprocessing, a second control unit could carry out interpolation, a third control unit could carry out regulation and/or control of axes, and a fourth could carry out administrative tasks.

This is advantageous as, for example, not all part programs require the same computing power to maintain performance.

Adapted to a computing load, multiple control units C1, . . . , Cm can also perform the same computing step collaboratively.

In order that the computing steps can again be assigned to the machines M1 . . . Mn, in particular during serial processing in the control process, each computing step preferably has an identifier. This identifier advantageously indicates for which machine M1 . . . Mn the computing step is intended.

To ensure correct processing of the computing steps, access to the machine-specific data of the individual machines is preferably granted to each control process or each control unit.

In particular for control purposes, it is advantageous if, for example, the control unit S1 can access each axis individually. In order to reduce a communication load caused thereby, one communication hub per machine M1 . . . Mn is advantageous.

Furthermore, in the case of similar or identical machines, it is conceivable to transmit information on similar axes in a bundled manner.

FIG. 3 shows a method for operating such a system. In a method step S1, a data packet is transmitted to one machine or multiple machines by at least one control unit. In a method step S2, the machine or the machines is or are Instructed by the data packet to carry out a work task. In a method step S3, a license required for carrying out the work task is provided by the licensing unit.

Advantageously, the control unit performs at least one computing step for determining the instruction for the machine or for the machines. This is preferably achieved before method step S1.

Advantageously, at least one setpoint value for at least one actuator is transmitted to the machine or machines.

Setpoint values are advantageously calculated in an interpolation for at least one axis, preferably for all axes of a machine.

Advantageously, the machine transmits actual values of at least one axis, preferably of all axes, to the control unit.

Advantageously, a new control value is calculated from the setpoint values and the actual values in a control algorithm for each axis of the machine. This is advantageously transmitted to the machine.

Actual values and control values are thus advantageously cyclically exchanged between the machine and the control unit.

New control values are advantageously calculated on the control unit with the actual value and the setpoint value.

On the machine, the control values are advantageously applied by the axes and new actual values are recorded.

Due to the multiplicity of axes in a machine park, the control algorithm is run very frequently and in parallel. Therefore, for example, a graphics card is suitable for carrying out these calculations.

The invention claimed is:

1. A system for controlling and/or regulating a plurality of machines, said system comprising:

a plurality of control units designed to communicate with the plurality of machines and to transmit to the plurality of machines a data packet which includes an instruction for carrying out a work task, wherein each of the plurality of control units is designed to carry out a computing step for determining the instruction for the plurality of machines, wherein each computing step is configured to have an identifier assigned thereto indicating which of the plurality of machines the computing step is intended, and wherein after determination of a current utilization of the plurality of control units, each computing step is executed by each of the plurality of control units dynamically adapted to the current utilization;

a licensing unit designed to provide a plurality of floating licenses combined in a license pool available to the plurality of machines such that each of the plurality of machines uses one of the plurality of the floating licenses required for carrying out the work task, with each one of the used plurality of floating licenses being awarded when an authorization to carry out the work task exists; and a communicative connection connecting the plurality of control units, the licensing unit and the plurality of machines.

2. The system of claim 1, wherein the authorization is a certain technical requirement comprising a maintaining of a certain speed or an ability to carry out a certain type of 3D printing.

3. The system of claim 1, further comprising a bus system, a wireless system or a mixed bus and wireless system for communicatively connecting the control unit, the licensing unit and the at least one of the plurality of machines.

4. The system of claim 3, wherein at least one of the plurality of machines includes a communication hub or is connected to a communication hub, with the communication hub designed for bundled transmission of machine-specific data, thereby reducing a communication load, preventing an overload of the bus system, and ensuring a real-time capability, as the transmission of data packets is not delayed.

5. The system of claim 1, wherein each of the plurality of control units is configured to execute a defined computing step from a number of computing steps or a plurality of defined computing steps from the number of computing steps.

6. The system of claim 1, wherein at least one of the plurality of control units is designed to receive machine-specific data via a data provision unit of at least one of the plurality of machines.

7. The system of claim 1, wherein the licensing unit is designed to provide pay-per-use licenses and the authorization exists when a payment has been made.

8. The system of claim 1, wherein at least one of the machines is designed to produce a three-dimensional object by additive manufacturing.

9. The system of claim 1, wherein the plurality of control units control the plurality of machines in an m:n relationship.

10. The system of claim 1, wherein each of the plurality of control units is specialized to suit particular tasks.

11. A method for operating a system for controlling and/or regulating a plurality of machines, said method comprising:

transmitting with a plurality of control units a data packet to the plurality of machines, with the data packet including an instruction for carrying out a work task, wherein each of the plurality of control units is designed to carry out a computing step for determining the instruction for the plurality of machines, wherein each computing step is configured to have an identifier assigned thereto indicating which of the plurality of machines the computing step is Intended, and wherein after determination of a current utilization of the plurality of control units, each computing step is executed by each of the plurality of control units dynamically adapted to the current utilization;

providing with a licensing unit a plurality of floating licenses combined in a license pool available to the plurality of machines such that each of the plurality of machines uses one of the plurality of the floating licenses required for carrying out the work task, with each one of the used plurality of floating licenses being awarded when an authorization to carry out the work task exists; and communicatively connecting the plurality of control units, the licensing unit, and the plurality of machines.

12. The method of claim 11, further comprising transmitting a setpoint value for at least one actuator to the at least one of the plurality of machines.

* * * * *